United States Patent
Kim et al.

(10) Patent No.: US 11,416,701 B2
(45) Date of Patent: Aug. 16, 2022

(54) DEVICE AND METHOD FOR ANALYZING SPATIOTEMPORAL DATA OF GEOGRAPHICAL SPACE

(71) Applicant: Electronics and Telecommunications Research Institute, Daejeon (KR)

(72) Inventors: Ji Yong Kim, Daejeon (KR); Jong Ho Won, Daejeon (KR); Mi Young Jang, Sejong-si (KR); Jang Ho Choi, Seoul (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 317 days.

(21) Appl. No.: 16/686,909

(22) Filed: Nov. 18, 2019

(65) Prior Publication Data
US 2020/0160101 A1 May 21, 2020

(30) Foreign Application Priority Data

Nov. 19, 2018 (KR) .................. 10-2018-0142910
Sep. 18, 2019 (KR) .................. 10-2019-0114916

(51) Int. Cl.
*G06K 9/62* (2022.01)
*G06T 7/90* (2017.01)
(Continued)

(52) U.S. Cl.
CPC .......... *G06K 9/6223* (2013.01); *G06F 16/55* (2019.01); *G06F 16/587* (2019.01);
(Continued)

(58) Field of Classification Search
CPC . G06T 2207/10036; G06T 2207/10032; G06T 2207/30188; G06K 9/0063;
(Continued)

(56) References Cited

U.S. PATENT DOCUMENTS 7,110,454 B1 * 9/2006 Chakraborty ...... G06K 9/00711
348/700
9,119,055 B2 8/2015 Vaccari et al.
(Continued)

FOREIGN PATENT DOCUMENTS

KR 10-1694282 1/2017
KR 10-1742488 6/2017
(Continued)

OTHER PUBLICATIONS

Paul, Frank, Christian Huggel, and Andreas Kääb. "Combining satellite multispectral image data and a digital elevation model for mapping debris-covered glaciers." Remote sensing of Environment 89.4 (2004): 510-518. (Year: 2004).*
(Continued)

*Primary Examiner* — Vincent Rudolph
*Assistant Examiner* — Raphael Schwartz
(74) *Attorney, Agent, or Firm* — Kile Park Reed & Houtteman PLLC (57) ABSTRACT

Provided are a device and method for analyzing spatiotemporal data of a geographical space including one or more regions. The method includes imaging spatiotemporally varying data, selecting a representative image according to each transition state based on a spatiotemporal change in the imaged data, grouping pixels in the selected image by clustering the pixels, and performing group-specific data analyses.

16 Claims, 6 Drawing Sheets

(51) Int. Cl.
  *G06F 16/587*   (2019.01)
  *G06F 16/583*   (2019.01)
  *G06F 16/55*    (2019.01)
  *G06V 20/10*    (2022.01)

(52) U.S. Cl.
  CPC ............ *G06F 16/5838* (2019.01); *G06T 7/90* (2017.01); *G06V 20/188* (2022.01); *G06V 20/194* (2022.01)

(58) Field of Classification Search
  CPC ........... G06K 9/00657; G06K 9/00637; G06K 2009/00644; G06K 2009/4657
  See application file for complete search history.

(56) References Cited

U.S. PATENT DOCUMENTS

| | | |
|---|---|---|
| 2015/0142780 A1 | 5/2015 | Oh et al. |
| 2015/0208464 A1 | 7/2015 | Heo et al. |

FOREIGN PATENT DOCUMENTS

| | | |
|---|---|---|
| KR | 10-1811640 | 12/2017 |
| KR | 10-1823792 | 1/2018 |
| KR | 10-1852129 | 4/2018 |
| KR | 10-2018-0044481 | 5/2018 |

OTHER PUBLICATIONS

Banerjee, Biplab, et al. "Unsupervised multi-spectral satellite image segmentation combining modified mean-shift and a new minimum spanning tree based clustering technique." IEEE journal of selected topics in applied earth observations and remote sensing 7.3 (2013): 888-894. (Year: 2013).*

Huang, Jing. "Detecting the Spatial Patterns of Blue-Green Algae in Harsha Lake Using Landsat 8 Imagery." (2016). (Year: 2016).*

Venkatesh, Y. V., and S. Kumar Raja. "On the classification of multispectral satellite images using the multilayer perceptron." Pattern Recognition 36.9 (2003): 2161-2175. (Year: 2013).*

Na Young Kang et al. "Performance Comparison of Clustering Technique For Spatio-Temporal Data", Journal of the Korean Institute of Intelligent Information Systems, vol. 10, No. 2, Nov. 2004. pp. 15-37.

Ga-On Kim et al. "An Edge Extraction Method Using K-means Clustering In Image", Journal of Digital Convergence, Nov. 2014; 12(11). pp. 281-288.

Jung-Il Park et al. "A Study on Green Algae Monitoring in Watershed Using Fixed Wing UAV", Journal of Korean Institute of Intelligent Systems. 27(2), Apr. 2017. pp. 164-169.

James F. Peters et al. "K-means Indiscernibility Relation over Pixels", Lecture Notes in Computer Science. Jun. 2004.

\* cited by examiner

DEVICE AND METHOD FOR ANALYZING SPATIOTEMPORAL DATA OF GEOGRAPHICAL SPACE

CLAIM FOR PRIORITY

This application claims priority to Korean Patent Applications No. 10-2018-0142910 filed on Nov. 19, 2018 and No. 10-2019-0114916 filed on Sep. 18, 2019 in the Korean Intellectual Property Office (KIPO), the entire contents of which are hereby incorporated by reference.

BACKGROUND

1. Technical Field

Example embodiments of the present invention relate in general to a device and method for analyzing spatiotemporal data of a geographical space and more specifically to a device and method for analyzing spatiotemporal data of a geographical space using a K-means algorithm.

2. Related Art

As research on the climate closely related to daily lives is considered important, environmental research based on environment space information and information communication technology (ICT)/Internet of things (IoT) is actively underway.

Such research is generally conducted by collecting IoT sensor data. Sensor data has a temporal association with each other as time-series data and likewise has a spatial association. As IoT sensors are installed everywhere, it is possible to collect regional data which is far more dense than that in the past in real time. In particular, data collected through images of a hyperspectral camera or meteorological environment data is valid data having spatial continuity.

However, when an analysis and estimation are made by applying an existing deep learning method, an artificial neural network (ANN), or a recurrent neural network (RNN) to such continuous data, the analysis and estimation are inefficient because there is an excessive amount of input data.

SUMMARY

Accordingly, example embodiments of the present invention are provided to substantially obviate one or more problems due to limitations and disadvantages of the related art.

Example embodiments of the present invention provide a method of analyzing spatiotemporal data of a geographical space including one or more regions.

Example embodiments of the present invention also provide a device for analyzing spatiotemporal data using the method of analyzing spatiotemporal data of a geographical space.

In some example embodiments, a method of analyzing spatiotemporal data of a geographical space including one or more regions includes: imaging spatiotemporally varying data; selecting a representative image according to each transition state based on a spatiotemporal change in the imaged data; grouping pixels in the selected image by clustering the pixels; and performing group-specific data analyses.

The grouping of the pixels in the selected image by clustering the pixels may include grouping the pixels by performing color segmentation on the pixels through a K-means algorithm.

The imaged data may be represented as five-dimensional vectors including pixel-specific color data and geographical information.

The performing of the group-specific data analyses may include: determining representative values each for the groups; and performing data analyses on the basis of the representative values.

The performing of the data analyses on the basis of the representative values may include: finding associations between the groups by performing group-specific association analyses on the basis of the representative values; setting the groups as nodes and setting inter-node links on the basis of results of the association analyses; and performing inter-node influence analyses according to a configuration of the inter-node links.

The performing of the inter-node influence analyses may include determining a major management target node connected to multiple nodes through a graph analysis of the configuration of the inter-node links.

The associations between the groups may be represented as determination coefficient values derived from correlation analyses.

The method may further include predicting an environmental event in one or more regions included in a corresponding group according to results of the group-specific data analyses, and the environmental event may include occurrence of blue-green algae.

Color data of each pixel may be represented in hue, saturation, and lightness (HSL) or hue, saturation, and value (HSV) format.

In other example embodiments, a device for analyzing spatiotemporal data of a geographical space including one or more regions includes: a processor; and a memory configured to store at least one command executed through the processor.

The at least one command may include: a command for imaging spatiotemporally varying data; a command for selecting a representative image according to each transition state based on a spatiotemporal change in the imaged data; a command for grouping pixels in the selected image by clustering the pixels; and a command for performing group-specific data analyses.

The command for grouping the pixels in the selected image by clustering the pixels may include a command for grouping the pixels by performing color segmentation on the pixels through a K-means algorithm.

The imaged data may be represented as five-dimensional vectors including pixel-specific color data and geographical information.

The command for performing the group-specific data analyses may include: a command for determining representative values each for the groups; and a command for performing data analyses on the basis of the representative values.

The command for performing the data analyses on the basis of the representative values may include: a command for finding associations between the groups by performing group-specific association analyses on the basis of the representative values; a command for setting the groups as nodes and setting inter-node links on the basis of results of the association analyses; and a command for performing inter-node influence analyses according to a configuration of the inter-node links.

The command for performing the inter-node influence analyses may include a command for determining a major management target node connected to multiple nodes through a graph analysis of the configuration of the inter-node links.

The associations between the groups may be represented as determination coefficient values derived from correlation analyses.

The at least one command may further include a command for predicting an environmental event in one or more regions included in a corresponding group according to results of the group-specific data analyses, and the environmental event may include occurrence of blue-green algae.

The pixel-specific color data may be represented in HSL or HSV format.

BRIEF DESCRIPTION OF DRAWINGS

Example embodiments of the present invention will become more apparent by describing in detail example embodiments of the present invention with reference to the accompanying drawings, in which.

DESCRIPTION OF EXAMPLE EMBODIMENTS

Example embodiments of the present invention are disclosed herein. However, specific structural and functional details disclosed herein are merely representative for purposes of describing example embodiments of the present invention, and example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising,", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It should also be noted that in some alternative implementations, the functions/acts noted in the blocks may occur out of the order noted in the flowcharts. For example, two blocks shown in succession may in fact be executed substantially concurrently or the blocks may sometimes be executed in the reverse order, depending upon the functionality/acts involved.

Hereinafter, example embodiments of the present invention will be described in detail with reference to the accompanying drawings.

The present invention relates to data analysis (prediction), and it is possible to predict environmental data, for example, blue-green algae, by analyzing spatiotemporally continuous data on the basis of geographical associations.

Figure 1:
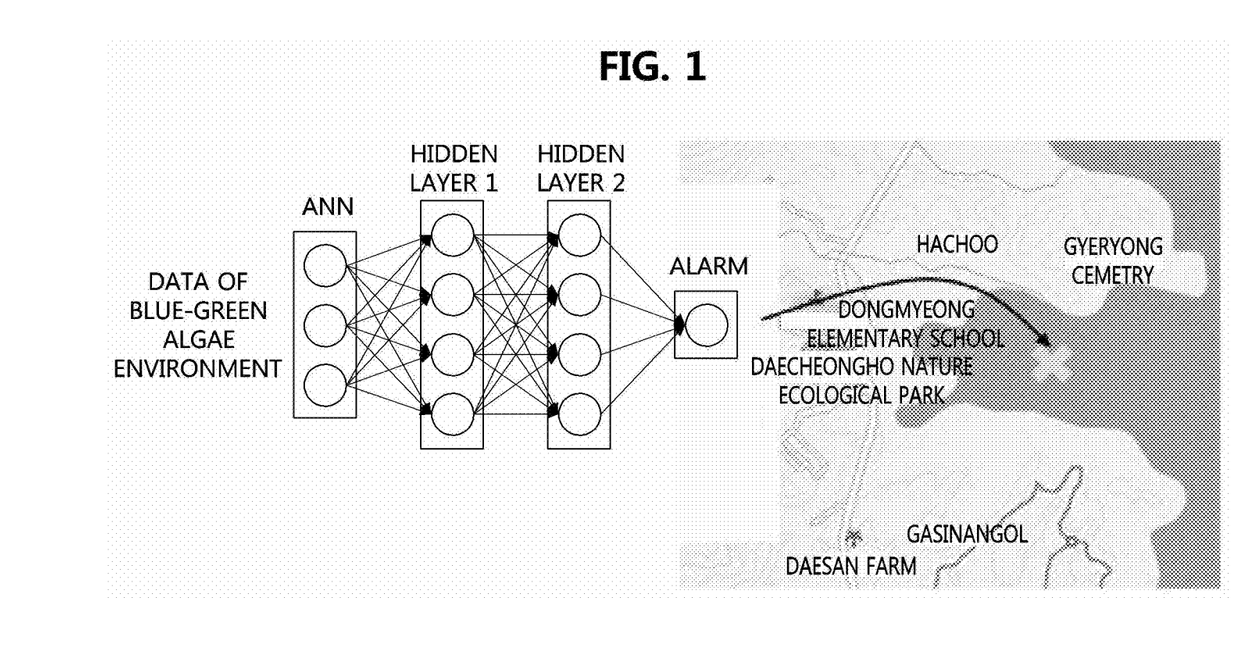
FIG. 1 is a conceptual diagram of a method of predicting blue-green algae by using deep learning.

FIG. 1 is a conceptual diagram of a method of predicting blue-green algae by using deep learning.

In FIG. 1, an artificial neural network (ANN) is used to predict blue-green algae.

An ANN is a statistical learning algorithm of machine learning and cognitive science derived from a biological neural network (particularly, brains in animals' central nervous system). An ANN collectively refers to any model in which artificial neurons (nodes) forming a network through synapses have problem-solving skills by changing synaptic connection intensities through learning.

For ANNs, there are supervised learning in which the ANN is optimized for a problem due to the input of a teaching signal (correct answer) and unsupervised learning which does not require a teaching signal. In general, supervised learning is used when there is a clear answer, and unsupervised learning is used for data clustering. An ANN is generally used to guess and approximate a veiled function which depends on many inputs. An ANN is generally represented as mutual connections in a neuron system which calculates a value from an input. Since an ANN is adaptive, it is possible to perform machine learning such as pattern recognition.

Meanwhile, a deep neural network (DNN) is an ANN including several hidden layers between an input layer and an output layer as shown in FIG. 1. Like a general ANN, a DNN is able to model complex non-linear relationships.

According to a general method of predicting blue-green algae by using deep learning, for example, eight environmental factors collected from a location marked by the sign "X" in FIG. 1 are used as input data of a network including two hidden layers to learn whether blue-green algae will occur at the location.

For example, when a spectral sensor collects data such as chlorophyll-a, it is possible to measure dense data. Then, when data is regionally collected from the lake Daecheon-gho (2.9 km×1.8 km) at intervals of 2 in, it is possible to collect data from 600,000 or more different locations. In this case, it is very inefficient to train an ANN regarding the 600,000 locations on the basis of the collected different pieces of measurement data.

To solve this problem, it is possible to analyze (predict) data at major locations and estimate data of other locations by linear interpolation, but the results are not accurate. When close locations have different geographical characteristics, pieces of data of the locations may be meaningful, but the corresponding method cannot reflect such an aspect sufficiently.

To solve this problem, the present invention is intended to efficiently analyze and predict data by dividing and grouping regions according to spatial characteristics. When regional characteristics are taken into consideration, it is possible to perform an analysis and make a prediction more accurately than in the existing linear interpolation method. In particular, the present invention proposes a method of predicting blue-green algae to control it.

Figure 2A:
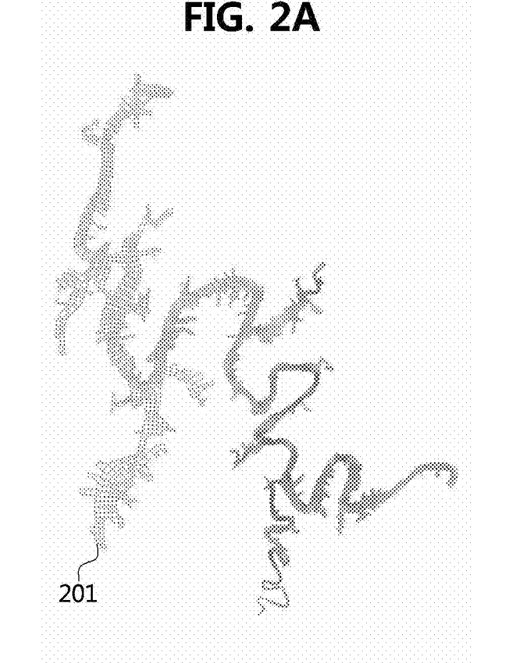
FIG. 2A is a view showing a blue-green algae prediction region divided in units of cells according to an example embodiment of the present invention.

FIG. 2A is a view showing a blue-green algae prediction region divided in units of cells according to an example embodiment of the present invention.

Figure 2B:
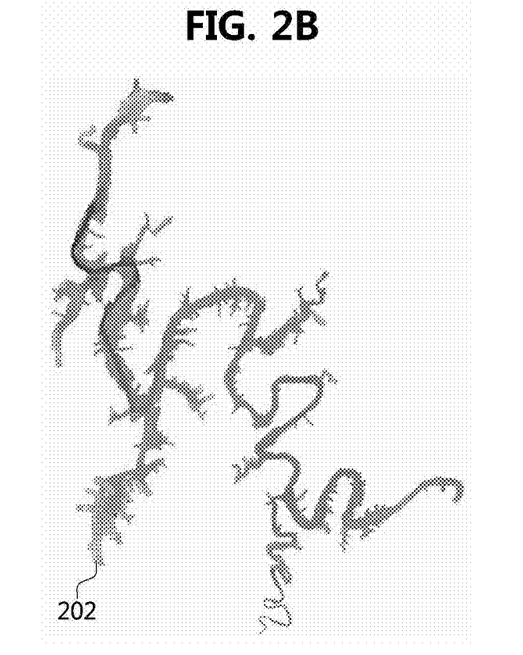
FIG. 2B is a view showing an example of the geographical model of FIG. 2A in which data is represented in colors.

In an example embodiment of the present invention, an analysis is performed on the basis of global spatial data. When collected data is in the form of an image, the collected data is used as it is, and when collected data is in the form of values, the collected data is converted into an image. FIGS. 2A and 2B show a method of visualizing data on a map.

In FIG. 2A, 201 shows a geographical model of a part of the river Geumgang. A data value of each grid is separately collected or generated through simulation. Cells have different values and are considered as separate units.

FIG. 2B shows an example of representing data in colors in the geographical model of FIG. 2A. In FIG. 2B, 202 visualizes grids, which have been processed as separate pieces of data, with divided data ranges. Red represents a high value, and blue represents a low value. Different heat map images may be generated over time in the form of 202, and a user may recognize a change in data through the images.

It is possible to collect and represent data of each cell as shown in FIGS. 2A and 2B, whereas when data is collected through a hyperspectral sensor (image), it is possible to directly use the collected raw data. Alternatively, data values may be input to cells geographically modeled through a post-processing, and then the content may be visualized in the form of 202 of FIG. 2B.

At this time, it may be inefficient to separately build neural networks for numerous cells shown in FIG. 2A or 2B. Therefore, in an example embodiment of the present invention, it is intended to reduce the number of targets to analyze by grouping similar cells.

Specifically, according to a method of grouping similar cells, cells which are regionally adjacent to each other may be grouped together. For example, when data is processed in units of 2×2 rectangle cells, which are slightly large cell units including cells regionally adjacent to each other, instead of units of 1×1 rectangle cells, it is possible to reduce the number of targets to analyze to ¼. However, even when cells are regionally adjacent to each other, they are not decided to have similar characteristics. In the case of water analysis, adjacency according to water flow is important, and in the case of air analysis, correlations are established according to a wind direction. A problem is that a method of grouping cells according to a fluid velocity field, a wind velocity, and a wind direction does not show high accuracy in relation to the complexity.

In an example embodiment of the present invention, a K-means algorithm is used to perform color segmentation on an image and divide the image according to state transition. The K-means algorithm is an algorithm for grouping given data into k clusters and operates in a manner to minimize the variance of distances between clusters. This algorithm is a type of autonomous learning and serves to label unlabeled input data.

Meanwhile, with regard to representative image selection according to state transition, when it is possible to acquire sufficient data, an average value may be selected and used as a representative image. Transition may separately occur according to time (seasons) or events.

Figure 3:
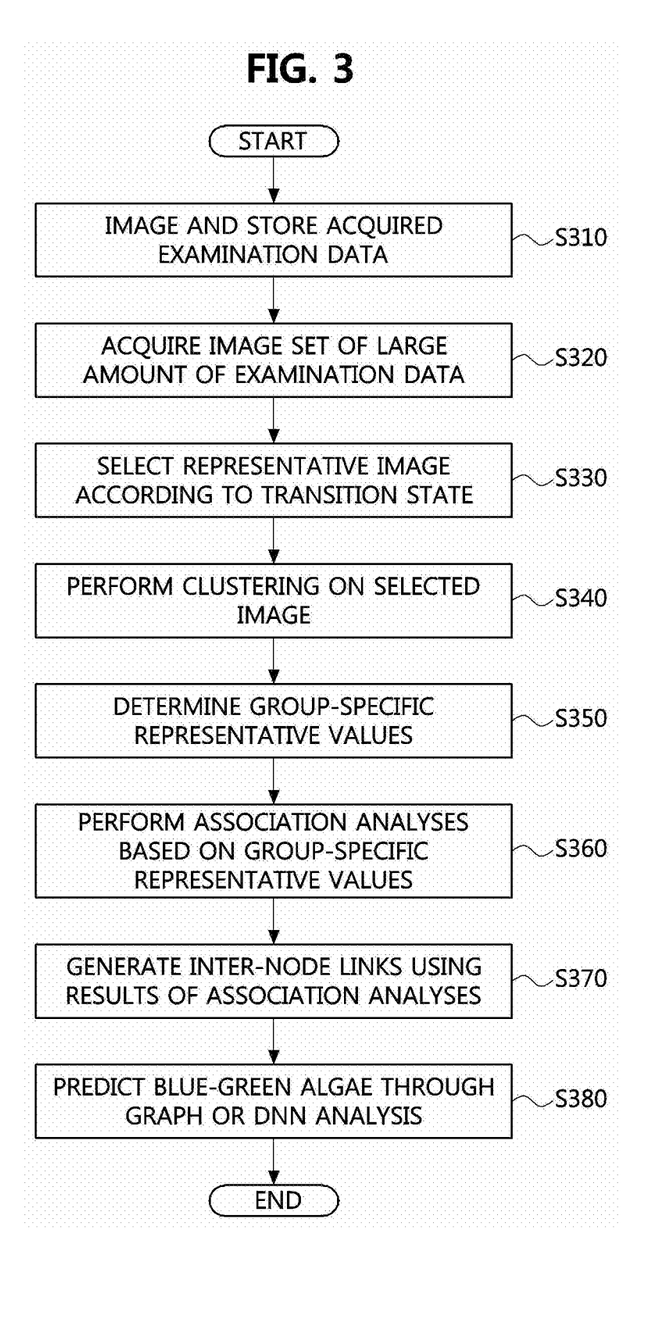
FIG. 3 is a flowchart illustrating a method of analyzing spatiotemporal data according to an example embodiment of the present invention.

FIG. 3 is a flowchart illustrating a method of analyzing spatiotemporal data according to an example embodiment of the present invention.

To analyze spatiotemporal data of a geographical space and predict blue-green algae according to an example embodiment of the present invention, a procedure for acquiring total examination data related to blue-green algae is performed first. The acquired data is imaged and stored (S310). A large amount of total examination data is imaged, and in this way, a set of images is acquired from the large amount of total examination data (S320).

Each image included in the image set may be classified according to state transition (process). A representative image or an average image is selected in each of the transition states (S330). Clustering is performed on the selected images through the K-means algorithm (S340). Subsequently, a representative value (or an average value) is determined for each group obtained by clustering (S350).

When group-specific representative values are determined, associations between groups are analyzed on the basis of the representative values (S360). Links are generated between the groups, which are considered as nodes, on the basis of results of the association analyses (S370). Subsequently, group-specific DNNs are built through a graph analysis, such as an influence analysis, to perform an analysis and make a prediction (S380).

Each operation of the method of analyzing spatiotemporal data according to an example embodiment of the present invention is described as follows.

In an examination data acquisition operation S310, it is important to acquire as much daily data as possible. Since data is used to select representative images or average images according to transition (process), it is possible to increase accuracy in analysis when sufficient examples are acquired.

Examination data is imaged and stored, and the storage format of the image is not limited to a specific format. In other words, the image may be stored in red-green-blue (RGB) format or hue, saturation, lightness (HSL) and/or hue, saturation, value (HSV) format. Most examined sensor data is numeric data and is high or low, long or short, or large or small. An image file format which easily reflects the characteristic is the HSL and/or HSV format. A method employing the HSL or HSV format is effective because it is possible to process two variates together when the two variates are related to each other.

In an example in which the HSV format is used, S and V values may be determined according to Equation 1 below.

[Equation 1]

$$S = \frac{(\text{Variate})}{(\text{Maximum Variate}) - (\text{Minimum Variate})} \times 100$$

For example, when measured data is a temperature, it is assumed that a temperature varies from minus 50 degrees Celsius (the minimum variate value) to 50 degrees Celsius (the maximum variate value). In this case, when a current temperature is 20 degrees Celsius (variate), S may be determined to be 70.

When imaged data is calculated in this way, the imaged data is classified according to the time or situation of the data. At this time, a domain expert may be used to classify the data. Such a classification of data may be referred to as a classification by state transition (process). In other words, this may be referred to as a process of attaching tag information to the image data. For example, there are temporal classifications such as water temperatures of Daecheongho in the spring, summer, autumn, and winter, and event-based classifications, such as water quality in the monsoon season and during drought in the spring. These classifications may be regularized and automated.

When images are classified into at least one group, a representative image may be selected for the group (S330). When the group has a sufficient number of samples, an average of the entire samples may be calculated and determined as a representative value.

In operation S340 of FIG. 3, clustering is performed through the K-means algorithm on the basis of the determined representative value (image). At this time, each piece of pixel data may be represented in the RGB or HSV format or as a three-dimensional vector, and the image may be divided. Alternatively, pixel data may be represented as five-dimensional vectors by inserting spatial information to three-dimensional vectors, and the image may be divided.

Spatial information may be in various formats, in which it is important to normalize the spatial information in the same unit as color values. In general cases, spatial information may be represented as five-dimensional vectors including RGB values and normalized into values between 0 and 1. For example, each pixel may be sampled in a form shown in Table 1.

TABLE 1

| Number | r | g | b | dx | dy |
|---|---|---|---|---|---|
| 1 | 0.5724 | 0.5686 | 0.1348 | 0.3215 | 0.6550 |
| 2 | 0.2239 | 0.7411 | 0.2136 | 0.2457 | 0.2145 |
| 3 | 0.5689 | 0.8000 | 0.6247 | 0.3245 | 0.2658 |
| 4 | 0.4215 | 0.6450 | 0.4457 | 0.1478 | 0.8457 |
| 5 | 0.7854 | 0.7490 | 0.0254 | 0.2658 | 0.7758 |
| 6 | 0.1112 | 0.7411 | 0.9874 | 0.1245 | 0.2145 |
| ... | ... | ... | ... | ... | ... |

When pieces of data have a close geographical association according to characteristics of a domain, the data may be classified with spatial information included therein. When data includes spatial information, it is possible to ensure accuracy in analysis (and prediction) by setting K to a large value.

Figure 4:
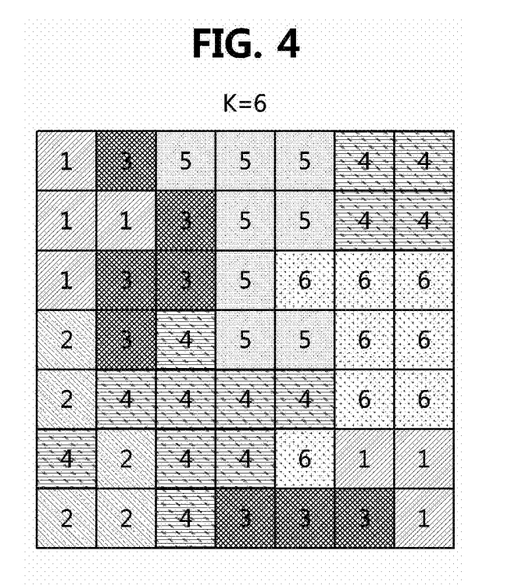
FIG. 4 is a diagram showing results of dividing an image by using a K-means algorithm according to an example embodiment of the present invention.

FIG. 4 is a diagram showing results of dividing an image by using the K-means algorithm according to an example embodiment of the present invention.

FIG. 4 shows an example of image dividing when K equals 6. Referring to FIG. 4, it is possible to see that image data may go through a clustering operation and then may be represented in a form including a plurality of groups.

Subsequently, in the group-specific representative value determination operation S350, a central vector may be calculated from each grid which is represented as one unit, or a region symbolizing a representative value may be selected, and data of the region may be designated as a representative value. When a corresponding group has sufficient data, it is preferable to calculate a central vector. However, considering efficiency in data analysis, it may be better to select a region. This is because it may be more convenient to select a representative location and use a measurement value acquired from the representative location as an input than to calculate a central vector every time and use the central vector as an input.

When group-specific representative values are determined, associations between groups are found through association analyses (S360). The association analyses result in a graph and is used in complex spatiotemporal analysis in which geographical associations are taken into consideration.

When associations between groups are found, a graph is formed by linking groups in a close association. In an example embodiment of the present invention, an association coefficient, that is, a determination coefficient $R^2$, is set to 0.65, but the value may be adjusted according to an application domain. For example, when K has a large value, the number of nodes increases. Therefore, to make a graph sparse, that is, not dense, it is effective to reduce the number of links by setting $R^2$ to a high value.

Equation 2 below shows a matrix of the determination coefficient $R^2$, which is a value obtained by squaring a correlation coefficient between groups i and j, as correlation analysis results.

$$R_{ij}^2 = \begin{pmatrix} 1 & 0.66 & 0.82 & 0.54 & 0.61 & 0.51 \\ & 1 & 0.71 & 0.68 & 0.48 & 0.61 \\ & & 1 & 0.81 & 0.88 & 0.59 \\ & & & 1 & 0.58 & 0.60 \\ & & & & 1 & 0.89 \\ & & & & & 1 \end{pmatrix} \quad [\text{Equation 2}]$$

Figure 5A:
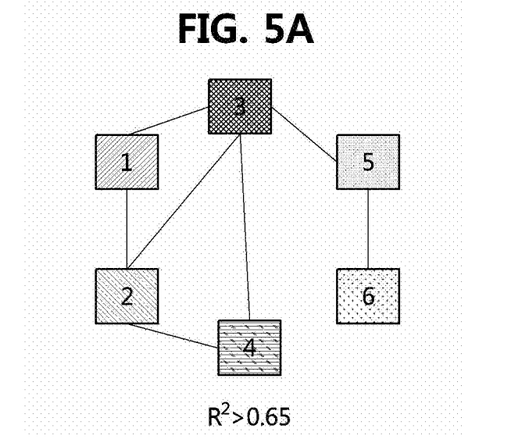
FIGS. 5A and 5B are diagrams showing links established on the basis of specific determination coefficient values according to an example embodiment of the present invention.
Figure 5B:
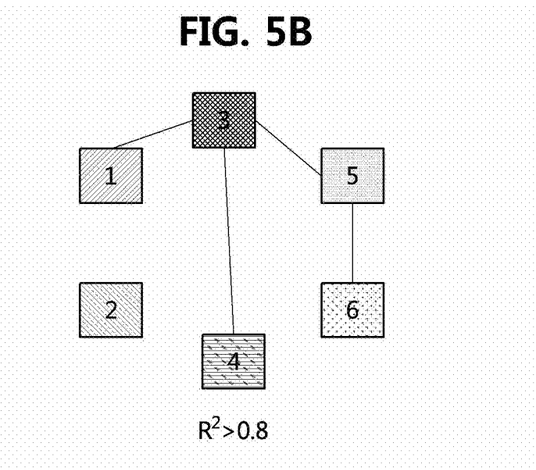

FIGS. 5A and 5B are diagrams showing links established on the basis of specific determination coefficient values according to an example embodiment of the present invention.

In FIGS. 5A and 5B, each group may be represented as a node distinguished by a number. Referring to Equation 2 and FIG. 5A, when a determination coefficient between nodes of group 2 and group 3 is 0.71 and a boundary value is determined to be 0.65, a link is displayed between the nodes of group 2 and group 3. In this case, when the boundary value is increased to 0.8, the link is vanished as shown in FIG. 5B.

Figure 6:
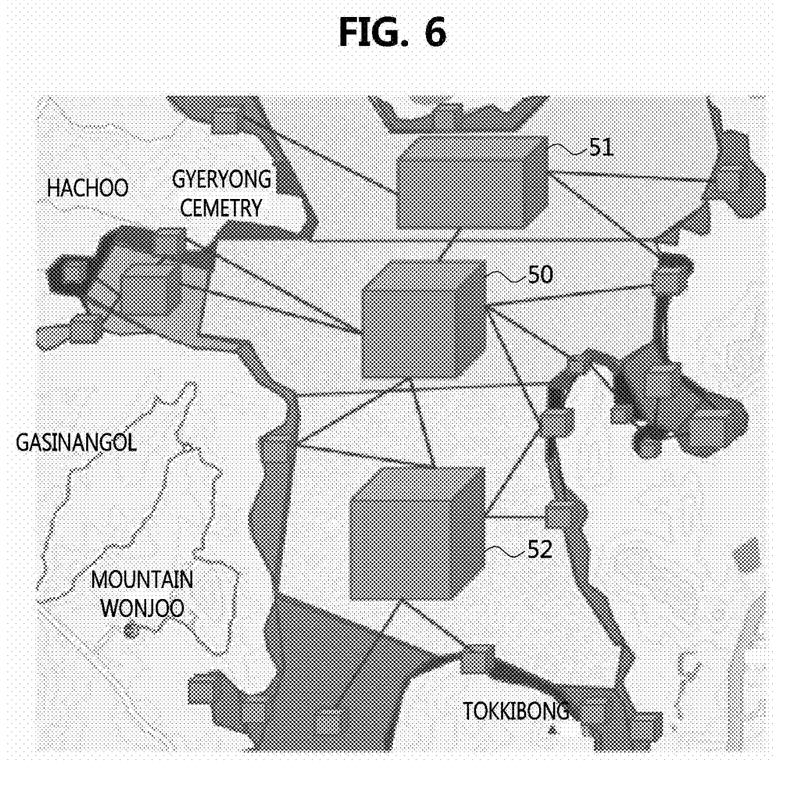
FIG. 6 is a view showing a geographical model for predicting blue-green algae by using inter-node links according to an example embodiment of the present invention.

FIG. 6 is a view showing a geographical model for predicting blue-green algae by using inter-node links according to an example embodiment of the present invention.

FIG. 6 shows an example in which similar cells in a geographical model for predicting the water quality of Daecheongho are grouped and used as a unit of analysis (and prediction). In the example of FIG. 6, geographical association is taken into serious consideration to divide a region into units adjacent to each other. This is because when clustering is performed on the basis of actual RGB values only, regions which are not adjacent to each other may be grouped together and may not be displayed on the map. In FIG. 6, the size of a node is shown in proportion to the size of similar regions.

A graph analysis may be performed on a geographical model built in this way. In the present invention, various graph analyses may be performed, and the content thereof may vary depending on an application domain. When an influence analysis is performed through such a graph analysis, it is possible to know where to intensively manage for a water quality improvement. For example, nodes 50, 51, and 52 have great influence on other nodes in FIG. 6. Among the nodes, the node 50 has the greatest influence, and thus it is necessary to intensively manage a region corresponding to the node 50 for a water quality improvement.

Also, the present invention may include analysis employing a DNN. As described above in example embodiments, according to the present invention, analysis is performed in units of groups, and prediction results are fixed in units of groups. When the present invention is used to analyze environmental data and make a prediction through a DNN, it is possible to predict blue-green algae information of locations other than a representative location of the same group on the basis of only data collected from the representative location because several locations of the same group are similar to each other.

Figure 7:
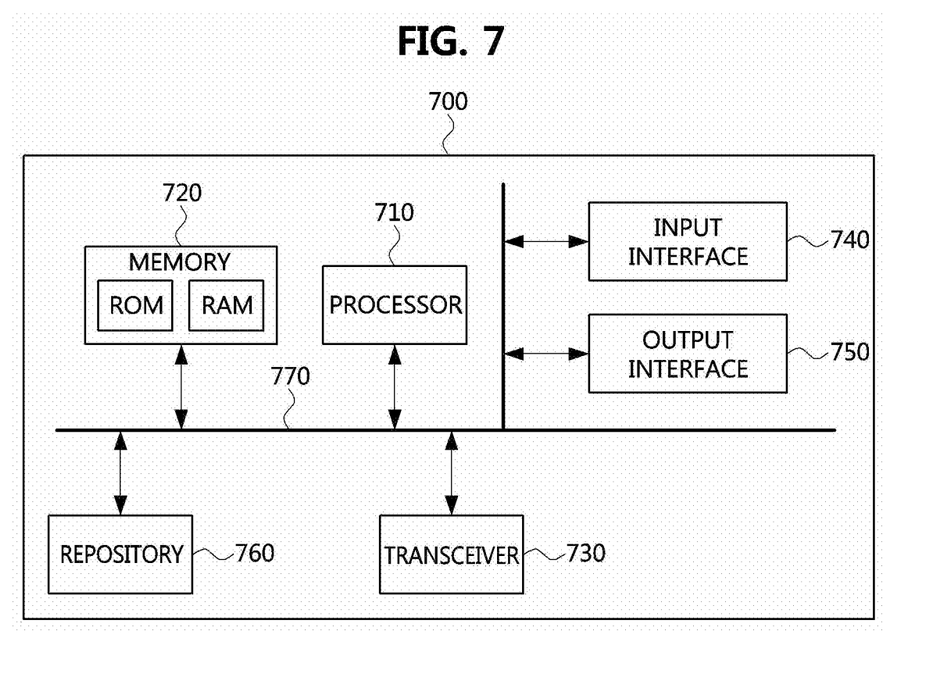
FIG. 7 is a block diagram of a device for analyzing spatiotemporal data of a geographical space according to an example embodiment of the present invention.

FIG. 7 is a block diagram of a device for analyzing spatiotemporal data of a geographical space according to an example embodiment of the present invention.

A device 700 for analyzing spatiotemporal data of a geographical space according to an example embodiment of the present invention may include at least one processor 710, a memory 720 which stores at least one command executed by the at least one processor 710, and a transceiver 730 which is connected to a network to perform communication. Data which is analyzed and predicted by the device 700 for analyzing spatiotemporal data of a geographical space may be data related to an environmental event, particularly, occurrence of blue-green algae. Therefore, the device 700 for analyzing spatiotemporal data of a geographical space may be, for example, a blue-green algae prediction device.

The device 700 for analyzing spatiotemporal data of a geographical space may further include an input interface 740, an output interface 750, a repository 760, and the like.

The elements included in the device 700 for analyzing spatiotemporal data of a geographical space may be connected through a bus 770 and communicate with each other.

The processor 710 may execute program commands stored in at least one of the memory 720 and the repository 760. The processor 710 may be a central processing unit (CPU), a graphics processing unit (GPU), or a dedicated processor whereby methods according to example embodiments of the present invention are performed. Each of the memory 720 and the repository 760 may be configured with at least one of a volatile storage medium and a non-volatile storage medium. For example, the memory 720 may be configured with at least one of a read-only memory (ROM) and a random access memory (RAM).

The at least one command may include a command for the processor 710 to image spatiotemporally varying data, a command for selecting a representative image according to each transition state based on a spatiotemporal change in the imaged data, a command for grouping pixels in the selected image by clustering the pixels, and a command for performing group-specific data analyses.

The command for grouping the pixels in the selected image by clustering the pixels may include a command for grouping the pixels by performing color segmentation on the pixels through the K-means algorithm.

The imaged data may be represented as five-dimensional vectors including pixel-specific color data and geographical information.

The command for performing the group-specific data analyses may include a command for determining representative values each for the groups and a command for performing data analyses on the basis of the representative values.

The command for performing the data analyses on the basis of the representative values may include a command for finding associations between the groups by performing group-specific association analyses on the basis of the representative values, a command for setting the groups as nodes and setting inter-node links on the basis of results of the association analyses, and a command for performing inter-node influence analyses according to a configuration of the inter-node links.

The command for performing the inter-node influence analyses may include a command for determining a major management target node connected to multiple nodes through a graph analysis of the configuration of the inter-node links.

The associations between the groups may be represented as determination coefficient values derived from correlation analyses.

The at least one command may further include a command for predicting an environmental event in one or more regions included in a corresponding group according to results of the group-specific data analyses, and the environmental event includes occurrence of blue-green algae.

The pixel-specific color data may be represented in HSL or HSV format.

The present invention described above with reference to example embodiments proposes an effective method of analyzing spatiotemporally continuous data and making a prediction. According to the method, an image is divided on the basis of similarity to track changes, and it is possible to make detailed predictions of an entire region distinguished from each other rather than a prediction of a specific region. Such predictions may derive far more accurate results than the existing linear interpolation method.

According to the above-described example embodiments of the present invention, it is possible to effectively predict blue-green algae by analyzing data which is spatiotemporally continuous.

According to the present invention, it is possible to make a detailed prediction of a specific region and also detailed predictions of an entire region distinguished from each other by dividing an image on the basis of similarity and tracking changes.

Operation of a method according to an example embodiment of the present invention can be implemented as a computer-readable program or code in a computer-readable recording medium. The computer-readable recording medium includes all types of recording devices in which data that can be read by a computer system is stored. Also, the computer-readable recording medium may be distributed among computer systems connected via a network such that the computer-readable program or code may be stored and executed in a distributed manner.

The computer-readable recording medium may include a hardware device specially configured to store and perform program commands, such as a ROM, a RAM, a flash memory, and the like. The program commands may include not only a machine language code generated by a compiler but also a high level language code that may be executed by a computer using an interpreter and the like.

Some aspects of the present invention have been described in the context of an apparatus, but may also represent the corresponding method. Here, a block or the apparatus corresponds to a step of the method or a characteristic of a step of the method. Likewise, aspects which have been described in the context of the method may be indicated by the corresponding blocks or items or characteristics of the corresponding apparatus. Some or all of steps of the method may be performed by (or using) a hardware device, such as a microprocessor, a programmable computer, or an electronic circuit. In some embodiments, one or more of important steps of the method may be performed by such a device.

In example embodiments, a programmable logic device (e.g., a field-programmable gate array (FPGA)) may be used to perform some or all of functions of the above-described methods. In example embodiments, the FPGA may operate in combination with a microprocessor for performing one of the above-described methods. In general, the methods may be performed by any hardware device.

While the exemplary embodiments of the present invention have been described above, those of ordinary skill in the art should understand that various changes, substitutions and alterations may be made herein without departing from the spirit and scope of the present invention as defined by the following claims.

What is claimed is:

1. A method of analyzing spatiotemporal data of a geographic space including one or more regions, the method comprising:
    imaging spatiotemporally varying data acquired from the geographic space to obtain different heat map images generated over time;
    selecting a representative image according to each transition state based on a spatiotemporal change in the imaged data including the different heat map images;
    grouping pixels in the selected image by clustering the pixels such that the selected image is represented in a form including groups;
    selecting a region symbolizing a group-specific representative value, wherein data of the selected region is designated as a representative value;
    performing association analysis between the groups on the basis of representative values, wherein the association analyses result in a graph;
    generating inter-node links between the groups on the basis of the result of the association analyses and a determination coefficient value, the groups setting as nodes; and
    performing group-specific data analyses based on a graph analysis of a configuration of inter-node links.

2. The method of claim 1, wherein the grouping of the pixels in the selected image by clustering the pixels comprises grouping the pixels by performing color segmentation on the pixels through a K-means algorithm.

3. The method of claim 1, wherein the imaged data is represented as five-dimensional vectors including pixel-specific color data and geographical information.

4. The method of claim 1, wherein the performing of the group-specific data analyses comprises determining a major management target node connected to multiple nodes through the graph analysis of the configuration of the inter-node links.

5. The method of claim 1, wherein the association analysis between the groups is represented as determination coefficient values derived from correlation analyses.

6. The method of claim 1, further comprising predicting an environmental event in one or more regions included in a corresponding group according to results of the group-specific data analyses.

7. The method of claim 6, wherein the environmental event comprises occurrence of blue-green algae.

8. The method of claim 1, wherein color data of each pixel is represented in hue, saturation, and lightness (HSL) or hue, saturation, and value (HSV) format.

9. A device for analyzing spatiotemporal data of a geographical space including one or more regions, the device comprising:
    a processor; and
    a memory configured to store at least one command executed through the processor,
    wherein the at least one command comprises:
    a command for imaging spatiotemporally varying data acquired from the geographic space to obtain different heat map images generated over time;
    a command for selecting a representative image according to each transition state based on a spatiotemporal change in the imaged data including the different heat map images;
    a command for grouping pixels in the selected image by clustering the pixels such that the selected image is represented in a form including groups;
    a command for selecting a region symbolizing a group-specific representative value, wherein data of the selected region is designated as a representative value;
    a command for performing association analysis between the groups on the basis of representative values, wherein the association analyses result in a graph;
    a command for generating inter-node links between the groups on the basis of the result of the association analyses and a determination coefficient value, the groups setting as nodes; and
    a command for performing group-specific data analyses based on a graph analysis of a configuration of inter-node links.

10. The device of claim 9, wherein the command for grouping the pixels in the selected image by clustering the pixels comprises a command for grouping the pixels by performing color segmentation on the pixels through a K-means algorithm.

11. The device of claim 9, wherein the imaged data is represented as five-dimensional vectors including pixel-specific color data and geographical information.

12. The device of claim 9, wherein the command for performing the group-specific data analyses comprises a command for determining a major management target node connected to multiple nodes through a graph analysis of the configuration of the inter-node links.

13. The device of claim 9, wherein the association analysis between the groups is represented as determination coefficient values derived from correlation analyses.

14. The device of claim 9, wherein the at least one command further comprises a command for predicting an environmental event in one or more regions included in a corresponding group according to results of the group-specific data analyses.

15. The device of claim 14, wherein the environmental event includes occurrence of blue-green algae.

16. The device of claim 9, wherein color data of each pixel is represented in hue, saturation, and lightness (HSL) or hue, saturation, and value (HSV) format.

\* \* \* \* \*